(12) United States Patent
Yamada

(10) Patent No.: US 10,136,018 B2
(45) Date of Patent: Nov. 20, 2018

(54) FUNCTION EXECUTION METHOD, INFORMATION PROCESSING APPARATUS, AND NON-TRANSITORY RECORDING MEDIUM STORING INSTRUCTIONS FOR INFORMATION PROCESSING APPARATUS

(71) Applicant: BROTHER KOGYO KABUSHIKI KAISHA, Nagoya, Aichi (JP)

(72) Inventor: Jun Yamada, Aichi (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 0 days.

(21) Appl. No.: 15/605,262

(22) Filed: May 25, 2017

(65) Prior Publication Data
US 2017/0346982 A1 Nov. 30, 2017

(30) Foreign Application Priority Data

May 25, 2016 (JP) .................. 2016-104495

(51) Int. Cl.
| G06F 15/00 | (2006.01) |
|---|---|
| H04N 1/00 | (2006.01) |
| G06F 3/0481 | (2013.01) |
| H04N 1/32 | (2006.01) |
| G06F 3/12 | (2006.01) |

(52) U.S. Cl.
CPC ..... *H04N 1/00973* (2013.01); *G06F 3/04817* (2013.01); *G06F 3/12* (2013.01); *H04N 1/00307* (2013.01); *H04N 1/00315* (2013.01); *H04N 1/32539* (2013.01); *H04N 2201/0094* (2013.01)

(58) Field of Classification Search
CPC ....... H04N 1/00973; H04N 2201/0094; H04N 1/00315; H04N 1/32539; H04N 1/00307; G06F 3/04817
USPC ...................................... 358/1.15
See application file for complete search history.

(56) References Cited

U.S. PATENT DOCUMENTS

| 2012/0304084 A1 | 11/2012 | Kim et al. |
| 2013/0242325 A1* | 9/2013 | Ishikawa ............ H04N 1/00076 |
| | | 358/1.13 |

FOREIGN PATENT DOCUMENTS

| JP | 2006-202089 A | 8/2006 |
| JP | 2014-519106 A | 8/2014 |

\* cited by examiner

*Primary Examiner* — Saeid Ebrahimi Dehkordy
(74) *Attorney, Agent, or Firm* — Scully, Scott, Murphy & Presser, P.C.

(57) ABSTRACT

An information processing apparatus has a display device, a touch panel, a communication device, and a controller. A default icon is displayed on the display device as a startup icon. Function information is received from the image processing apparatus, the function information indicating multiple functions of the image processing apparatus. When a particular status is occurring in relation to at least one of the multiple functions, particular status information is received from the image processing apparatus, the particular status information indicating the particular status and display the startup icon displayed on the display device to a function icon corresponding to the received particular status information, and display a status icon indicating the particular status.

20 Claims, 10 Drawing Sheets

FIG. 2A

<APPARATUS STATUS INFORMATION TABLE> (MFP)

| APPARATUS ID | NUMBER OF FAX | NUMBER OF SCAN | FIRMWARE VERSION | STATUS |
|---|---|---|---|---|
| MFC - XXXX | 0 | 3 | 1.00 | 0 : Ready |

FIG. 2B

<APPARATUS STATUS INFORMATION TABLE> (MFP)

| APPARATUS ID | NUMBER OF FAX | NUMBER OF SCAN | FIRMWARE VERSION | STATUS |
|---|---|---|---|---|
| MFC - YYYY | 2 | 0 | 1.01 | 0 : Ready |

FIG. 2C

<APPARATUS STATUS INFORMATION TABLE> (MFP)

| APPARATUS ID | NUMBER OF FAX | NUMBER OF SCAN | FIRMWARE VERSION | STATUS |
|---|---|---|---|---|
| MFC - ZZZZ | 0 | 0 | 1.01 | 101 : Replace Ink Cyan |

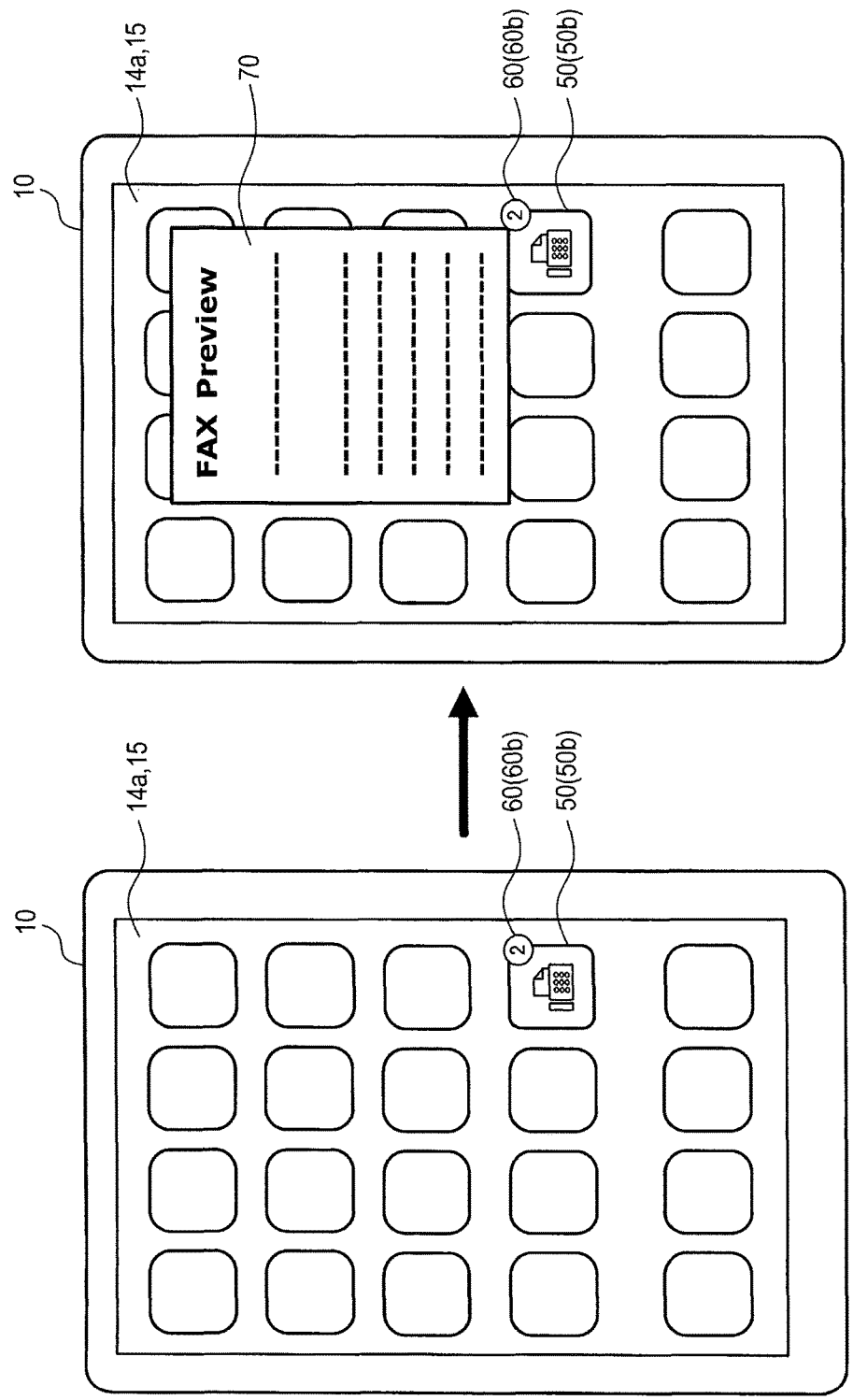

FUNCTION EXECUTION METHOD, INFORMATION PROCESSING APPARATUS, AND NON-TRANSITORY RECORDING MEDIUM STORING INSTRUCTIONS FOR INFORMATION PROCESSING APPARATUS

CROSS-REFERENCE TO RELATED APPLICATIONS

This application claims priority under 35 U.S.C. § 119 from Japanese Patent Application No. 2016-104495 filed on May 25, 2016. The entire subject matter of the application is incorporated herein by reference.

BACKGROUND

Technical Field

The present disclosures relate to a technique of using an image processing apparatus from an information processing apparatus through a wireless communication.

Related Art

Recently, portable communication terminals provided with touch panels have been widely used. There is known a conventional portable terminal which is configured such that, multiple icons respectively corresponding to multiple applications are displayed on a display of the portable terminal, and in response to a user selection of one of the multiple icons, an application corresponding to the selected icon is started.

It is also known a technique of detecting a particular status regarding a function executed by an application, and displaying an icon indicating occurrence of such a particular status together with the icon for starting up the application.

For example, there is known an e-mail icon for starting up an e-mail transmitting/receiving application (hereinafter, referred to as a startup icon), which icon is typically displayed with another icon indicating the number of received e-mail messages. Such a status icon displayed together with the startup icon is generally known as a badge.

It is convenient to a user if a badge indicating that a particular status has occurred is displayed together with a startup icon, since the user can recognize occurrence of the particular status regarding the application corresponding to the startup icon.

SUMMARY

There could be a case where the currently occurring particular status cannot be identified only because the badge is displayed. For example, when the badge is displayed together with the e-mail startup icon, the user recognizes the number of received e-mail messages, but cannot immediately know the contents of the e-mail messages. In order to recognize the contents of the e-mail message, the user needs to start up the application, and take necessary steps to transit screens to display the contents of respective e-mail messages.

In particular, when the application is configured to execute data communication with an image processing apparatus having multiple functions to receive various types of data, and a badge is displayed regarding one of the multiple functions, it is difficult for the user to immediately recognize to which function the particular status has occurred simply by viewing the badge. In order to know what status has occurred with respect what function, the user needs to start up the application and perform necessary operation steps, which is not necessarily be convenient to the user.

In consideration of the above, the present disclosures provides a technique according to which the user can easily recognize the particular status and the function to which the particular status is related when the particular status occurs in the image processing apparatus.

According to aspects of the disclosures, there is provided a non-transitory recording medium storing computer-readable instructions which cause, when executed by a controller of a computer, a function execution process of an information processing apparatus, the computer being provided with a display device having an image displaying area, a touch panel configured to detect a first operation and a second operation with respect to the displaying area of the display device discriminatingly from each other, a communication device configured to execute wireless communication with an image processing apparatus, the first operation being at least one of in contact with and in close proximity to the touch panel, the second operation being pressing of the touch panel by the indicator at a particular strength or more. The information processing apparatus is configured to display a startup icon on the display area of the display device, the function execution process being started in response to the first operation with respect to the startup icon, a default icon being initially set to the startup icon. The instructions, when executed by the controller, cause the information processing apparatus to receive function information from the image processing apparatus by executing wireless communication through the communication device, the function information indicating multiple functions of the image processing apparatus. When a particular status is occurring in relation to at least one of the multiple functions indicated by the received function information, receives particular status information from the information processing apparatus by executing wireless communication through the communication device, the particular status information indicating the particular status of the image processing apparatus and displays the startup icon displayed on the display device to a function icon indicating a function corresponding to the received particular status information, and display a status icon indicating the particular status represented by the received particular status information.

According to aspects of the disclosures, there is provided an information processing apparatus, which has a display device having an image displaying area, a touch panel configured to detect a first operation and a second operation with respect to the displaying area of the display device discriminatingly from each other, the first operation being at least one of in contact with and in close proximity to the touch panel, the second operation being pressing of the touch panel by the indicator at a particular strength or more, a communication device configured to wirelessly communicate with the image processing apparatus, and a controller. The controller is configured to display a default icon on the display device as a startup icon to start the function execution process, receive function information from the image processing apparatus by executing wireless communication through the communication device, the function information indicating multiple functions of the image processing apparatus; when a particular status is occurring in relation to at least one of the multiple functions indicated by the received function information, receives particular status information from the information processing apparatus by executing wireless communication through the communication device, the particular status information indicating the particular status of the image processing apparatus and displays the startup icon displayed on the display device to a function icon indicating a function corresponding to the received particular status information, and display a status icon indicating the particular status represented by the received particular status information.

According to further aspects of the disclosures, there is provided a function execution method of an information processing apparatus which is provided with a display device having an image displaying area, a touch panel configured to detect a first operation and a second operation with respect to the displaying area of the display device discriminatingly from each other, a communication device configured to execute wireless communication with an image processing apparatus, the first operation being at least one of in contact with and in close proximity to the touch panel, the second operation being pressing of the touch panel by the indicator at a particular strength or more. The method includes displaying a startup icon on the display area of the display device, the function execution process being started in response to the first operation with respect to the startup icon, a default icon being initially set to the startup icon, receiving function information from the image processing apparatus by executing wireless communication through the communication device, the function information indicating multiple functions of the image processing apparatus, when a particular status is occurring in relation to at least one of the multiple functions indicated by the received function information, receiving particular status information from the information processing apparatus by executing wireless communication through the communication device, the particular status information indicating the particular status of the image processing apparatus and displaying the startup icon displayed on the display device to a function icon indicating a function corresponding to the received particular status information, and display a status icon indicating the particular status represented by the received particular status information.

BRIEF DESCRIPTION OF THE ACCOMPANYING DRAWINGS

FIGS. 2A-2C show examples of device status information table of an MFP (multi-function peripheral) of the image processing system shown in FIG. 1.

FIGS. 5A and 5B illustrate an example of the standby screen of the portable terminal when a particular status occurs in the MFP.

DESCRIPTION OF THE EMBODIMENT

Hereinafter, referring to the accompanying drawings, an illustrative embodiment according to the disclosures will be described.

(1) General Description on Image Processing System

Figure 1:
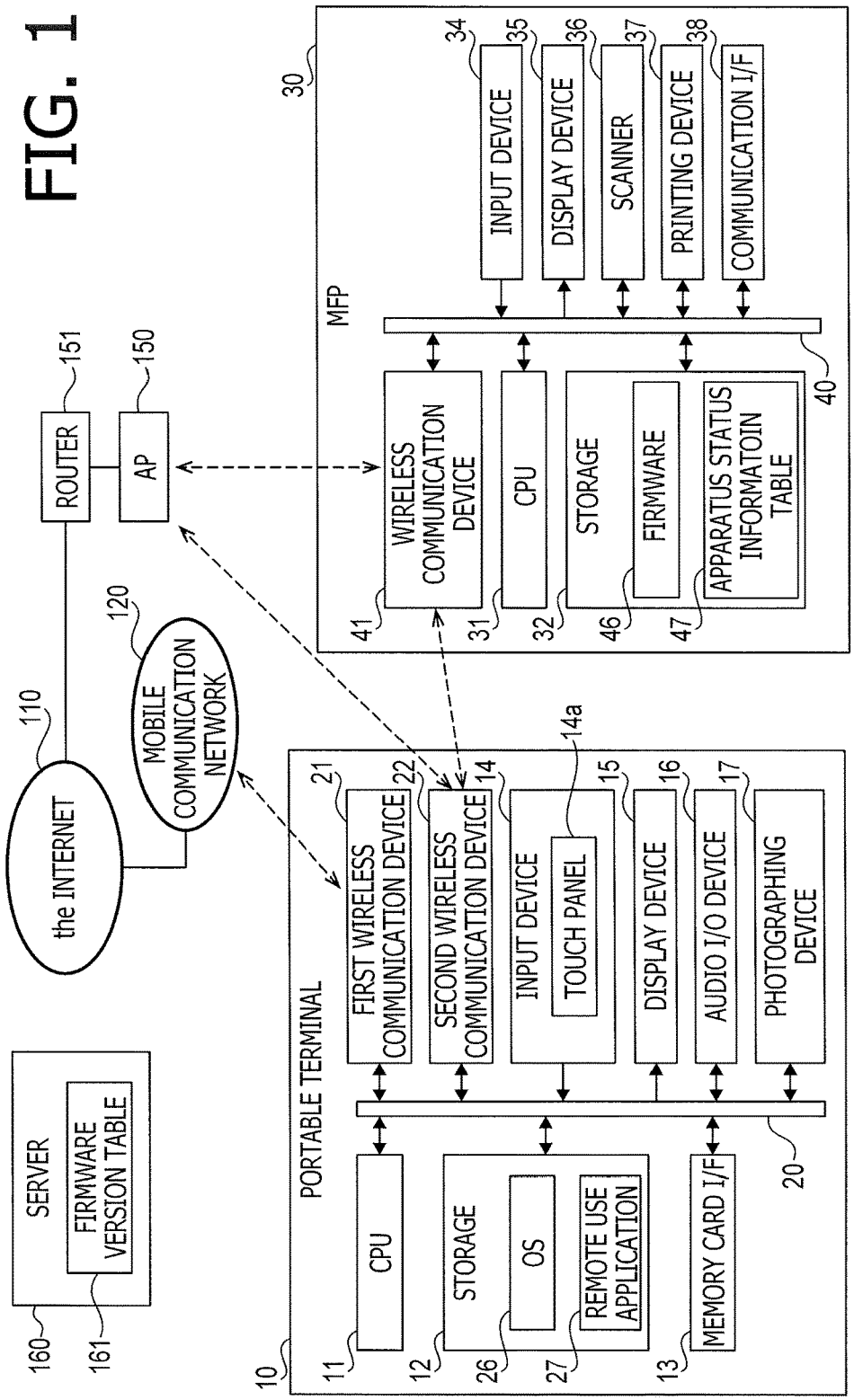
FIG. 1 is a block diagram illustrating a configuration of an image processing system according to an illustrative embodiment of the disclosures.

As shown in FIG. 1, an image processing system according to the illustrative embodiment includes a portable terminal 10 and an MFP (multi-function peripheral) 30.

The portable terminal 10 is an information processing apparatus which can be carried and used (e.g., a smartphone, a tablet terminal and the like). The portable terminal 10 has a CPU (central processing unit) 11, a storage 12, a memory card I/F (interface) 13, an input device 14, a display device 15, an audio I/O device 16, a photographing device 17, a first wireless communication device 21, a second wireless communication device 22, which are interconnected through a bus line 20.

The CPU 11 realizes the respective functions by executing programs stored in a non-transitory storage medium. According to the illustrative embodiment, the storage 12 serves as the non-transitory storage medium. It is noted that, in the following description, the CPU 11 executing a program will occasionally be referred to as a name of the program. Further, a recitation of which subject is a "program" may sometimes mean the "CPU 11 which executes a program". Recitations regarding a CPU 31 of the MFP 30 should also be treated similarly.

The storage 12 includes at least one semi-conductor memory such as a ROM (read only memory), a RAM (random access memory) and a flash memory. It should be noted that a part or all of a function realized by the CPU 11, which is executing a program, may alternatively be realized by a hardware having a combination of logical circuits and/or analog circuits.

The memory card I/F 13 is an interface to which a non-volatile rewritable memory card (not shown) is to be attached, and is configured to control reading/writing data from/to the attached memory card.

The input device 14 is configured to acquire input operations by the user, and provided with a touch panel 14a. The input device 14 may also have further inputting devices such as operation buttons and the like. The display device 15 is configured to display an image, and may have a liquid crystal display (not shown).

The storage 12 stores various kinds of software and data. According to the illustrative embodiment, an OS (operating system) 26 and a remote use application 27 are stored in the storage 12 as the software. The remote use application 27 includes image data of various icons (described data). The OS 26 and the remote use application 27 have been installed in a computer system including the CPU 11.

The touch panel 14a is overlaid on an image displaying area of the displaying device 15. The touch panel 14a is an input device configured to detect an indicating operation by the user to indicate a particular position on the image displaying area through an indicator such as a finger or a pen. It is noted that the term "indicate" here means a condition where the indicator contacts the touch panel 14a or a condition where the indicator is located at a position very close (i.e., in close proximity) to the touch panel 14a or both.

The touch panel 14a according to the illustrative embodiment is configured such that, when the indicating operation through the indicator is performed, the touch panel 14a outputs a detection signal indicating a position at which the indicating operation is performed. That is, when the touch panel 14a is configured to detect a contact of the indicator, the touch panel 14a outputs the detection signal indicating a position at which the indicator touches the touch panel 14a. When the touch panel 14a is configured to detect a closely located state of the indicator, the touch panel 14a outputs the detection signal indicating a position at which the indicator is detected to be closely located to the touch panel 14a.

Further, the touch panel 14a according to the illustrative embodiment is configured such that, when an indicator touches the touch panel 14a, the touch panel 14a can detect a contacting strength of the indicator with categorizing the contacting strength into at least two levels.

Specifically, the touch panel 14a is configured to output the detection signal including a particular signal representing that the contacting strength of the indicator is equal to or greater than a particular threshold value when the indicator contacts the touch panel with its contacting strength being equal to or greater than the particular threshold value. Further, when the indicator contacts the touch panel with its contacting strength is less than the particular threshold value, the touch panel 14a may output the detection signal which does not include the above particular signal. Alternatively or optionally, in such a case, the touch panel may output the detection signal which includes another signal which is different from the above particular signal.

It is noted that the contacting strength above may be defined by force (unit: [N]), pressure (unit: [Pa]) or physical quantity of other systems of units. It is noted that, in the following description, a term "indicating operation" means at least one of a condition where the indicator contacts the touch panel 14a at a contacting strength which is less than a strength threshold value and another condition where the indicator is located very close to the touch panel 14a unless otherwise specifically noted. Further, in the following description, a condition where the indicator contacts the touch panel 14a at the contacting strength which is greater than the strength threshold value will be referred to as a pressing operation.

The CPU 11 determines, based on the detection signals output by the touch panel 14a, whether indicating operations through the indicator has been executed, whether the pressing operation has been performed, whether the indicating operation has been performed, whether the pressing operation has been performed, and positions at which the indicating operation or the pressing operation has been performed.

The remote use application 27 obtains indicator information representing the detection result which is detected by the OS 26, and determines, based on the indicator information, whether an indicating operation through the indicator is done, and whether the pressing operation is done. Further, the remote use application 27 determines, based on the indicator information, the positions at which the indicating operation or the pressing operation is done. It is noted that the OS 26 may be configured to execute the above determinations and transmit the results to the remote use application 27.

When the indicating operation is being performed, the remote use application 27 obtains information representing a moving condition of the indicating position and determines the movement of the indicator which is being operated for the indicating operation. It is noted that the information representing the moving condition of the indicating position represents at least one of a moving amount, a moving speed, a moving acceleration, and a moving direction.

The moving amount is obtained, for example, by operating changing amounts of coordinate positions indicated by the detection signals output by the touch panel 14a. The moving speed is obtained, for example, based on a time period to detect one coordinate position and to detect another coordinate position, and a distance between the two coordinate positions. The moving acceleration is obtained based on a changing amount of the moving speed. The moving direction is obtained, for example, by calculating changing directions of the coordinate positions represented by the detection signals output by the touch panel 14a. With the above information, the image editing application 27 can detect operations, as the operations with use of the indicator, a tapping operation, a dragging operation, a flicking operation, a swiping operation, a pinch-in operation, a pinch-out operation, and the like. Also in this case, the OS 26 may be configured to execute the above determinations/detections and transmit the results to the remote use application 27.

The audio I/O device 16 is a device having a microphone and a speaker through which audio signals are input/output. The photographing device 17 serves as a so-called digital camera, and is configured to photograph an image and generate image data representing the image. The image data photographed by the photographing device 17 is stored, for example, in the storage 12.

The first wireless communication device 21 is an interface used to execute an audio communication and a data communication through the mobile communication network 120. The first wireless communication device 21 may be configured, for example, to execute a wireless communication according to the LTE (long term evolution) standard.

The second wireless communication device 22 is an interface used to execute a communication in accordance with the wireless LAN standard (hereinafter, referred to as a wireless LAN). According to the illustrative embodiment, the wireless LAN communication the second wireless communication device 22 executes is a wireless LAN communication according to IEEE 802.1b/g/n.

The mobile terminal 10 is configured to execute the wireless LAN communication with an AP (access point) 150 through the second wireless communication device 22. The AP 150 is a relaying device configured to relay the wireless communication.

The AP 150 is connected to the Internet 110 through the router 151. Accordingly, the mobile terminal 10 can connect to the Internet 110 through the AP 150 and the router 151. It is noted that the mobile terminal 10 can also be connected to the Internet 110 through the first wireless communication device 21 and the mobile communication network 120.

To the Internet 110, multiple information processing apparatuses including the server 160 are connected. The portable terminal 10 is configured to execute a data communication with the information processing apparatuses connected to the Internet through the first wireless communication device 21 or the second wireless communication device 22.

The server 160 is provided by, for example, a vendor of the MFP 30. The server 160 is configured to supply information regarding various types of MFP's including the MFP 30 and other equipment the vendor supplies.

Figures 3, 4:
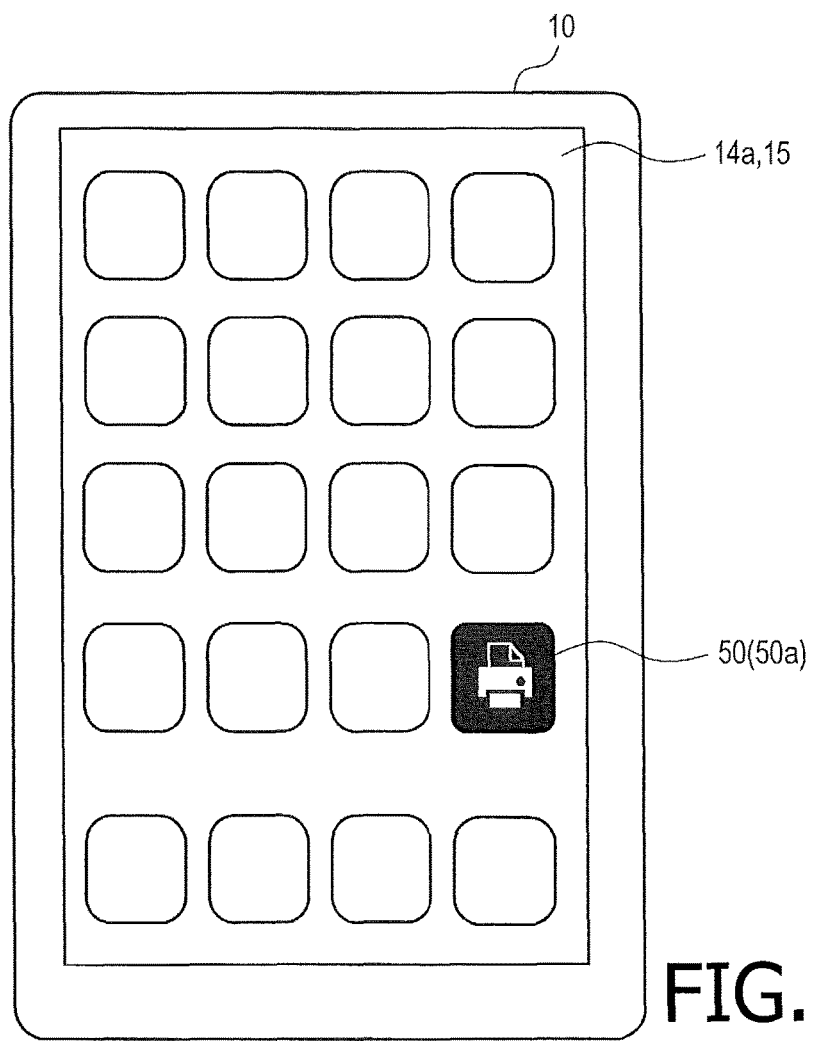
FIG. 3 shows an example of a firmware version table of a server of the image processing system shown in FIG. 1.
FIG. 4 shows an example of a standby screen of a portable terminal of the image processing system shown in FIG. 1.

The information stored in the server 160 includes a firmware version table 161. The firmware version table 161 stores the latest version of firmware of various equipment supplied by the vendor. FIG. 3 shows an example of the firmware version table 161. In this example, the latest firmware versions of multiple devices are stored respectively. For example, the latest version of an MFP, of which device ID is "MFC-XXXX" is 1.00. It is noted that the device ID is an ID assigned to each model of MFP and intrinsic to the model of the MFP.

The MFP 30 has functions of printing, scanning, copying and facsimile. In addition to the above-described main functions, the MFP has a status monitoring function, and a firmware management function (described later).

The MFP 30 has a CPU 31, a storage 32, an input device 34, a display 35, a scanner 36, a printer 37 and a wireless communication device 41. These components are interconnected through a bus line 40.

The storage 32 stores programs for realizing each of the above functions. That is, the CPU 31 realizes each of the above functions by executing appropriate programs stored in the storage 32.

The programs stored in the storage 32 include a firmware 46, which is configured to realize the above-described functions. That is, the above-described functions are realized when the CPU 31 executes the firmware 46. When an MFP 30 is shipped from a manufacturer, generally, the latest version of the firmware 46 at the time of shipping is installed in the MFP 30.

It is noted that there is a case where a later version of firmware 46 may be supplied by the vendor as the firmware 46 after the MFP 30 is shipped. The MFP 30 according to the illustrative embodiment has a firmware management function. The firmware management function is a function of obtaining a latest version of the firmware if the firmware of which version is newer than the currently stored firmware is available, and updating the firmware 46 stored in the storage 32. It is noted that the latest firmware 46 may be obtained by downloading the same through the Internet.

The wireless communication device 41 has the same configuration as the second wireless communication device 22 of the mobile terminal 10, and has the same function as the second wireless communication device 22. Accordingly, the mobile terminal 10 and the MFP 30 can make the wireless LAN communication with each other through the AP 150. It is noted that the mobile terminal 10 and the MFP 30 may be configured to directly execute the wireless LAN communication with each other without through the AP 150. Alternatively or optionally, the data communication between the mobile terminal 10 and the MFP 30 may be executed according to a communication method other than the wireless LAN.

The input device 34 is a device through which the input operations by the user is received. The input device 34 has a touch panel (not shown). The display 35 is a displaying device configured to display images. For example, the display 35 has an LCD.

The printer 37 is a main component for realizing the printing function, and provided with various composite members for printing images on printing sheets. Such composite members of the printer 37 include ink cartridges. The printer 37 is configured to print images on the printing sheets. According to the illustrative embodiment, the MFP 30 is configured to print both monochromatic images and color images, and has black, cyan, magenta and yellow cartridges as ones used for printing.

The MFP 30 has the status monitoring function to monitor various statues of the MFP 30. When one of the statues subject to monitoring is detected to be in an abnormal status, the MFP 30 executes a particular warning process.

The status monitoring function includes a function of detecting a remaining amount of each of consumables used in the MFP 30, and executing a warning operation when the remaining amount is equal to or lower than a particular amount level. According to the illustrative embodiment, at least the ink cartridges of four colors described above as the consumables, the remaining amount of which are subject to monitoring.

According to the status monitoring function, the remaining amount of the ink in each of the four ink cartridges is detected periodically, and when one, the remaining amount of which is equal to or lower than the particular level, a particular warning process is executed. It is noted that concrete contents of the warning process, the particular level, which is mentioned above and serves as determination criteria can be determined arbitrarily.

The scanner 36 is a main component for realizing the scanning function, and configured to read an image of an original and generate image data (hereinafter, referred to as scan data) of the read image. The scan data thus generated is stored in the storage 32.

The scan data generated by the scanner 36 can be printed by the printer 37, or transmitted externally through the wireless communication device 41. According to the illustrative embodiment, the scan data generated by the scanner 36 can be transmitted to the portable terminal 10 wirelessly. Specifically, according to the illustrative embodiment, the MFP 30 can transmit data representing size-reduced image for preview in addition to the scan data.

The MFP 30 according to the illustrative embodiment has a function of counting the number of pieces of scan data stored in the storage 32 as the number of scans. When the scanner 36 reads an image of the original and generates the scan data representing the image, the MFP 30 stores the scan data in the storage 32 and increment the number of scans by one. When the scan data is wirelessly transmitted to another equipment or a particular deleting operation is performed, the scan data is deleted from the storage 32. When the scan data is deleted from the storage 32, the number of scans is decremented by an amount corresponding to the number of pieces of scan data deleted from the storage 32.

It is noted that, when the scan data is wirelessly transmitted to another equipment, the scan data is not necessarily be deleted from the storage 32. Such scan data may be remained in the storage after wirelessly transmitted, and be deleted when a particular deleting condition is satisfied. In such a case, decrement of the number of scans may be performed when the scan data is deleted, or when the scan data is transmitted to another equipment.

The communication I/F 38 is a main component for realizing the facsimile function and is a communication interface for transmitting/receiving facsimile data through a communication network (not shown), which is connected to the communication network. The MFP 30 is configured to transmit the facsimile data to external equipment, or received the facsimile data from the external equipment through the communication I/F 38. According to the illustrative embodiment, the facsimile data received from the external equipment can be wirelessly transmitted to the portable terminal 10.

The network connected to the communication I/F 38 may be a telephone network or other networks such as the Internet. Alternatively, multiple networks may be connected to the communication I/F 38, and the facsimile data may be transmitted/received by selectively using one of the multiple networks.

When the facsimile data is received through the communication I/F 38, the received facsimile data is stored in the storage 32. The received facsimile data can be printed by the printer 37, or transmitted to external equipment through the wireless communication device 41. According to the illustrative embodiment, the received facsimile data can be wirelessly transmitted to the portable terminal 10. Specifically, in addition to the received facsimile data as it is, data representing size-reduced image for preview can also be wirelessly transmitted.

The MFP 30 is configured such that, every time when the facsimile data is received and stored in the storage 32, a newly-received flag indicating that the data is newly received is assigned. Then, the MFP 30 counts the number of pieces of facsimile data to which the newly-received flags are assigned as the number of faxes. Every time the facsimile data is received, the MFP 30 assigned the newly-received flag to the facsimile data, stores the same in the storage 32, and increments the number of faxes by one.

The newly-received flag assigned to the facsimile data is cleared when a particular clearing condition is satisfied. There would be various clearing conditions. For example, the clearing condition may be a condition where the facsimile data or the preview data thereof are wirelessly transmitted to external equipment, or a condition where the facsimile data is printed out by the MFP 30 or the preview data is displayed by the MFP 30. It is noted that a condition where the facsimile data to which the newly-received flag is assigned is deleted is also one of the clearing conditions. When the clearing condition is satisfied and the newly-received flag is cleared, the number of faxes is decremented an accordance with the number of cleared newly-received flags.

In the storage 32, the apparatus status information table 47 is stored in addition to the firmware 46. The apparatus status information table 47 is information indicating various statuses of the MFP 30, and is generated by the firmware 46. Examples of the apparatus status information table 47 are shown in FIGS. 2A-2C.

As shown in FIGS. 2A-2C, the apparatus status information table 47 includes the apparatus ID, the number of faxes, the number of scans, the firmware version and the status. Among these items, the number of faxes and the number of scans are as described above. That is, in the apparatus status information table 47, the latest number of faxes, and the latest number of scans currently counted are stored. Every time when the number of faxes and/or the number of scans are increased/decreased, the corresponding numbers in the apparatus status information table 47 are updated. Alternatively, the MFP 30 may check the latest number of faxes and the latest faxes, and update the apparatus status information table 47 when the latest number of faxes and/or the latest number of scans are changed from those in the table.

The firmware version indicates the version of the firmware 46 currently stored in the storage 32. When the firmware is updated, the firmware version stored in the apparatus status information table 47 is also updated to the version of the firmware after update.

The status is information indicating the result of monitoring according to the status monitoring function described above. When no abnormality is detected by the status monitoring function, information indicating no abnormality is stored in the apparatus status information table 47. In the example shown in FIGS. 2A and 2B, as information indicating no abnormality, "0: Ready" is indicated.

When the abnormality is detected by the status monitoring function, information indicating the abnormality is stored in the apparatus status information table 47. For example, when it is detected that the remaining amount in a cyan ink cartridge becomes a particular level or less, information indicating that a cyan ink cartridge should be replace is stored in the apparatus status information table 47 as the status.

It is apparent by comparing FIGS. 2A-2C and FIG. 3 that firmware of the latest versions are installed in the apparatuses of which ID are "MFC-XXXX" and "MFC-ZZZZ", while, in the apparatus of which ID is "MFC-YYYY", the firmware which is older than the latest version is installed.

(2) Remote Use Application

The remote use application 27 installed in the portable terminal 10 is software for wirelessly and remotely operating the MFP 30. The remote use application 27 is supplied, for example, by the vendor of the MFP 30, and can be installed in various models of information processing apparatus including the portable terminal 10.

When the remote use application 27 is installed in the portable terminal 10, the OS 26 displays a startup icon 50, which indicates the remote use application 27 and is for starting up the remote use application 27, on the display device 15 as shown in FIG. 4. As the startup icon 50, in a default setting, a default icon 50a as shown in FIG. 4 is displayed. It is noted that the screen on which the startup icon 50 is displayed is referred to as a standby screen. When an indicating operation using the indicator is performed with respect to the startup icon 50 displayed in the standby screen, the OS 26 starts up the remote use application 27.

The remote use application 27 according to the illustrative embodiment has functions, for example, of printing, scanning, facsimile and monitoring. The printing function includes a function of transmitting the image data from the portable terminal 10 to the MFP 30, and cause the MFP 30 to print the image data.

The scanning function includes a function of causing the portable terminal 10 to instruct the MFP 30 to read an image, a function of obtaining the number of scans and displays the same, a function of causing the MFP 30 to wirelessly transmit the scan data and/or preview data representing a reduced image to the portable terminal 10 and receiving the same, and a function of displaying the preview images of the scanned images in accordance with the received data.

The facsimile function includes a function of obtaining the number of faxes from the MFP 30 and displaying the same, a function of causing the MFP 30 to wirelessly transmit the facsimile data and/or preview data representing a reduced image to the portable terminal 10 and receiving the same, and a function of displaying the preview images of the scanned images in accordance with the received data.

The monitoring function includes a function of obtaining various statuses of the MFP 30 and displaying the same, a function of obtaining information indicating the version of the firmware currently installed in the MFP 30 and displaying the same, and a function of instructing the MFP 30 to update the firmware to the latest version.

The above-described functions the remote use application 27 has can be typically realized as a user indicates the startup icon 50 displayed on the display device 15 to start up the remote use application 27. When the startup icon 50 is indicated and operated and the remote use application 27 is started, the remote use application 27 displays a function selection screen (not shown) which allows the user to select the function to be executed from among the above-described functions on the display device 15. When one of the functions is selected on the function selection screen, a details selection screen (not shown) for the selected function is displayed. When a particular operation is performed with respect to the details selection screen, the selected function can be executed. For example, when the selected function is the monitoring function, the information regarding the status of the MFP 30 is displayed for review.

As described above, the user can confirm various statuses of the MFP 30 through the portable terminal 10 via some indicating operations and transitions of screens in association with the indicating operations.

The remote use application 27 according to the illustrative embodiment further has an apparatus status notifying function according to which the remote use application 27 periodically starts up, obtains a particular part of statuses of the MFP 30 and displays the same on the standby screen, even if the startup icon 50 is not indicated by the indicator.

After the remote use application 27 is installed in the portable terminal 10, in order to use the remote use application 27 to remotely operate the MFP 30, it is necessary to register a target MFP 30 with the application. Specifically, after the remote use application 27 is installed, by starting up the remote use application 27 and executing a particular registration process, the target MFP 30 can be registered.

The registration process is executed such that, for example, apparatuses which can communicate with the portable terminal 10 are searched through the second wireless communication device 22, and encourage the user to select one of the searched apparatuses. When an MFP 20 is selected as the target MFP 30 to be remoted operated, the remote use application 27 executes a function information obtaining process. Specifically, the portable terminal 10 executes a wireless communication with the target MFP 30 and obtains function information indicating multiple functions the target MFP 30 has.

The remote use application 27 executes a startup reservation with respect to the OS 26 so that the remote use application 27 is periodically started up in order to periodically execute the apparatus status notifying function regardless of the user's intent. Once the start reservation is received, the OS 26 thereafter periodically starts up the remote use application 27 in accordance with a designated timing. It is noted that the timing at which the remote use application 27 is started up can be determined arbitrarily, and may be determined to be started up at every constant interval.

When the remote use application 27 is started up, it confirms a startup factor. When the startup factor is the indicating operation of the startup icon 50, the remote use application 27 displays the function selection screen as described above. Thereafter, the process proceeds in accordance with the user operations.

When the startup factor of the remote use application 27 is the startup reservation, the remote use application 27 realizes the apparatus status notifying function by executing a program of an apparatus status notifying process, which is one of the processing programs the remote use application 27 has. The apparatus status notifying process will be described in detail referring to FIGS. 7A-7C. Here, the apparatus status notifying function realized by the apparatus status notifying process will generally be described.

When the apparatus status notifying function is executed, the remote use application 27 determines whether a particular status is occurring in at least one of the multiple functions the MFP 30 has through the second wireless communication device 22. According to the illustrative embodiment, the remote use application 27 determines whether a particular status is occurring regarding each of the facsimile function, the scanning function, the firmware management function and the status monitoring function from among the multiple functions the MFP 30 has, based on the function information obtained from the MFP 30 when the registration process is executed.

It is noted that the particular status regarding the facsimile function is a condition where the number of faxes is one or more. The particular status regarding the scanning function is a condition where the number of scans is one or more. The particular status regarding the firmware management function is a condition where there exists a newer version of the firmware than the firmware 46 currently installed. The particular status regarding the status monitoring function is a condition where, for example, one of particular multiple kinds of status abnormalities is occurring in the MFP 30. It is noted that the multiple kinds of status abnormalities include a condition where the remaining amount of consumables is equal to or less than a particular level.

In order to determine whether the particular status(s) is occurring, the remote use application 27 obtains information stores as the apparatus status information table from the MFP 30. Further, the remote use application 27 accesses the server 160 through the Internet 110 and obtains the firmware of the latest firmware version of the firmware 46 of the MFP 30.

When it is determined that the obtained information is the particular status information indicating that the particular status is occurring in the MFP 30, the remote use application 27 switches the startup icon 50 in accordance with the occurring particular status, and the status icon 60 indicating the contents of the particular state currently occurring in the MFP 30 is overlaid on the startup icon 50.

Figure 6A:
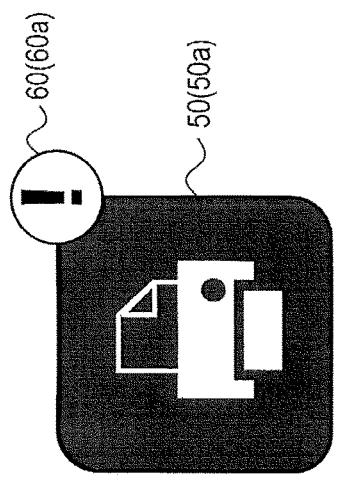
FIGS. 6A-6E show examples of startup icons and status icons displayed on the standby screen of the portable terminal when the particular status occurs in the MFP.
Figure 6B:
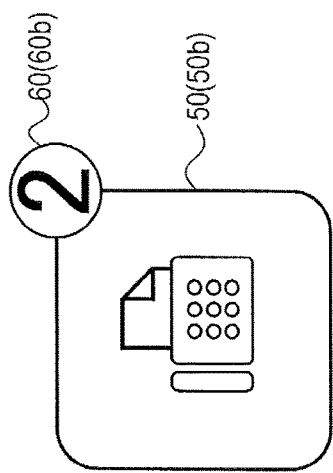
Figure 6C:
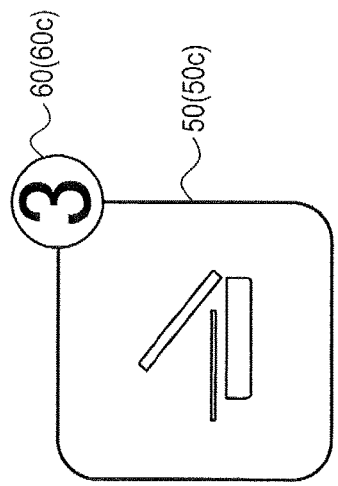
Figure 6D:
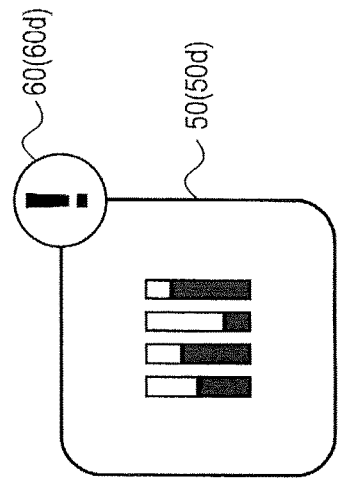
Figure 6E:
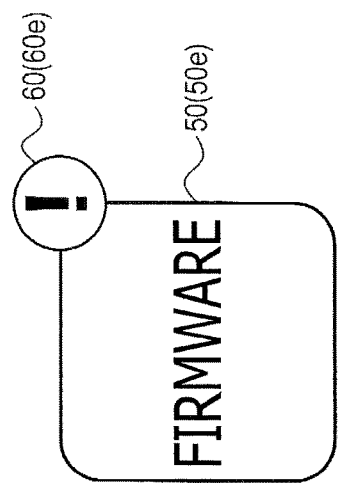

For example, when the version of the firmware 46 currently installed in the MFP 30 is an older version than the latest version, a firmware icon 50e corresponding to the firmware management function as shown in FIG. 6E is displayed, instead of the default icon 50a, as the startup icon 50 to be displayed on the display device 15. Further, as the status icon 60, a firmware warning icon 60e indicating that the firmware can be updated is displayed to be partially overlaid on the firmware icon 50e.

As described above, the firmware icon 50e is displayed as the startup icon 50 and further the firmware warning icon 60e is displayed, the user can recognize that the firmware of the MFP 30 can be updated easily and quickly, without starting up the remote use application 27.

Optionally, in response to a pressing operation to the firmware icon 50e, or the indicating operation or the pressing operation to the firmware warning icon 60e, information indicating that the firmware can be updated may be displayed, or causing the MFP 30 to execute updating of the firmware.

Even though the status abnormality is occurring in the MFP 30, if the abnormality does not relate to the remaining amount of the consumables but to another abnormality, the startup icon 50 displayed on the display device 15 remains as the default icon 50a, and a status warning icon 60a indicating occurrence of the status abnormality is overlaid, as the status warning icon 60a, on the default icon 50a.

As described above, although the startup icon 50 remains as the default icon 50a, as the status warning icon 60a is displayed in a manner overlaid on the default icon 50a, the user can easily and quickly recognize occurrence of the status abnormality other than the shortage of the consumables in the MFP 30, without starting up the remote use application 27.

Further optionally, in response to a pressing operation to the default icon 50*a*, or an indicating operation or a pressing operation to the status warning icon 60*a*, contents of the occurring abnormality may be displayed concretely or the portable terminal 10 may be connected to a FAQ (frequently asked questions) site corresponding to the currently occurring abnormality to display the same on the display device 15.

When the warning process is executed since the remaining mount of the consumables is equal to or less than the particular level in MFP 30, a consumable icon 50*d*, which particularly corresponds to a function of monitoring the remaining amount of the consumables in the status monitoring function, as shown in FIG. 6D is displayed as the startup icon 50 to be displayed on the display device 15 instead of the default icon 50*a*. Further, as the status icon 60, a consumable waring icon 60*d* indicating that the remaining amount of the consumable is equal to or less than the particular level is displayed so as to be partially overlaid on the consumable icon 50*d*.

As above, since the consumable icon 50*d* is displayed as the startup icon 50, and further the consumable warning icon 60*d* is displayed, the user can recognize easily and quickly necessity of exchange of the consumables in the MFP 30 without starting up the remote use application 27.

Further optionally, in response to a pressing operation with respect to the consumable icon 50*d*, or an indicating operation or a pressing operation with respect to the consumable warning icon 60*d*, information indicating concrete types of the consumables may be displayed, or the portable terminal 10 may be connected to a consumable purchasing site at which the user can purchase online the consumables and the site may be displayed on the display device 15.

When it is counted that the number of faxes is one or more in the MFP 30, a fax icon 50*b* corresponding to the facsimile function as shown in FIG. 6B is displayed, instead of the default icon 50*a*, as the startup icon 50 to be displayed on the display device 15. Further, as the status icon 60, the number of faxes icon 60*b* indicating the number of faxes is displayed so as to be partially overlaid on the fax icon 50*b*.

FIG. 5A shows a condition where the fax icon 50*b* is displayed as the startup icon 50, and the number of faxes icon 60*b* shown in FIGS. 5A, 5B and 6B is an image representing a number "2", which indicates that the number of faxes is two.

As described above, since the fax icon 50*b* is displayed as the startup icon 50, and the number of faxes icon 60*b* is additionally displayed, the user can recognize that new facsimile data is received, and the number of faxes easily and quickly, without starting up the remote use application 27.

Further optionally, in response to the pressing operation with respect to the facsimile icon 50*b*, or the indicating operation or the pressing operation with respect to the number of faxes icon 60*b*, a preview image of newly received and stored facsimile data (described later) may be displayed on the display device 15. FIG. 5B shows a case where the preview image of second one of the two pieces of facsimile data is displayed in a pop-up screen.

When it is counted that the number of scans is one or more, a scan icon 50*c* as shown in FIG. 6C corresponding to the scanning function is displayed as the startup icon 50, instead of the default icon 50*a*, on the display device 15.

Further, as the status icon 60, the number of scans icon 60*c* indicating the number of scans is partially overlaid on the scan icon 50*c*. The number of scans icon 60*c* shown in FIG. 6C is an image of the number "3" indicating that the number of scans is three.

As described above, since the scan icon 50*c* is displayed as the startup icon 50 and further the number of scans icon 60*c* is displayed, the user can easily and quickly recognize a fact that new scan data is generated and the number of scans in the MFP 30, without starting up the remote use application 27.

Further optionally, in response to the pressing operation with respect to the scan icon 50*c*, or the indicating operation or the pressing operation with respect to the number of scans icon 60*c*, a preview image of newly generated and stored scan data on the display 15.

According to the illustrative embodiment, when the particular statuses are occurring simultaneously in the multiple different functions, respectively, switching of the startup icon 50 and displaying of the status icon 60 are executed with respect to the function having the highest priority. According to the illustrative embodiment, priorities are assigned to the firmware management function, the status monitoring function, the facsimile function, and the scanning function in this order. That is, the firmware management function has the highest priority, and the scanning function has the lowest priority among the four functions. Assume that the version of the firmware 46 installed in the MFP 30 becomes older and the number of faxes is one or more. In this case, since the priority of the facsimile function is lower than the priority of the firmware management function, the startup icon 50 is switched to the firmware icon 50*e*, and the firmware warning icon 60*e* is partially overlaid on the firmware icon 50*e* as the status icon 60. The apparatus status notifying process shown in FIGS. 7A-7C reflects the above-described priority.

(3) Apparatus Status Notifying Process

Figure 7A:
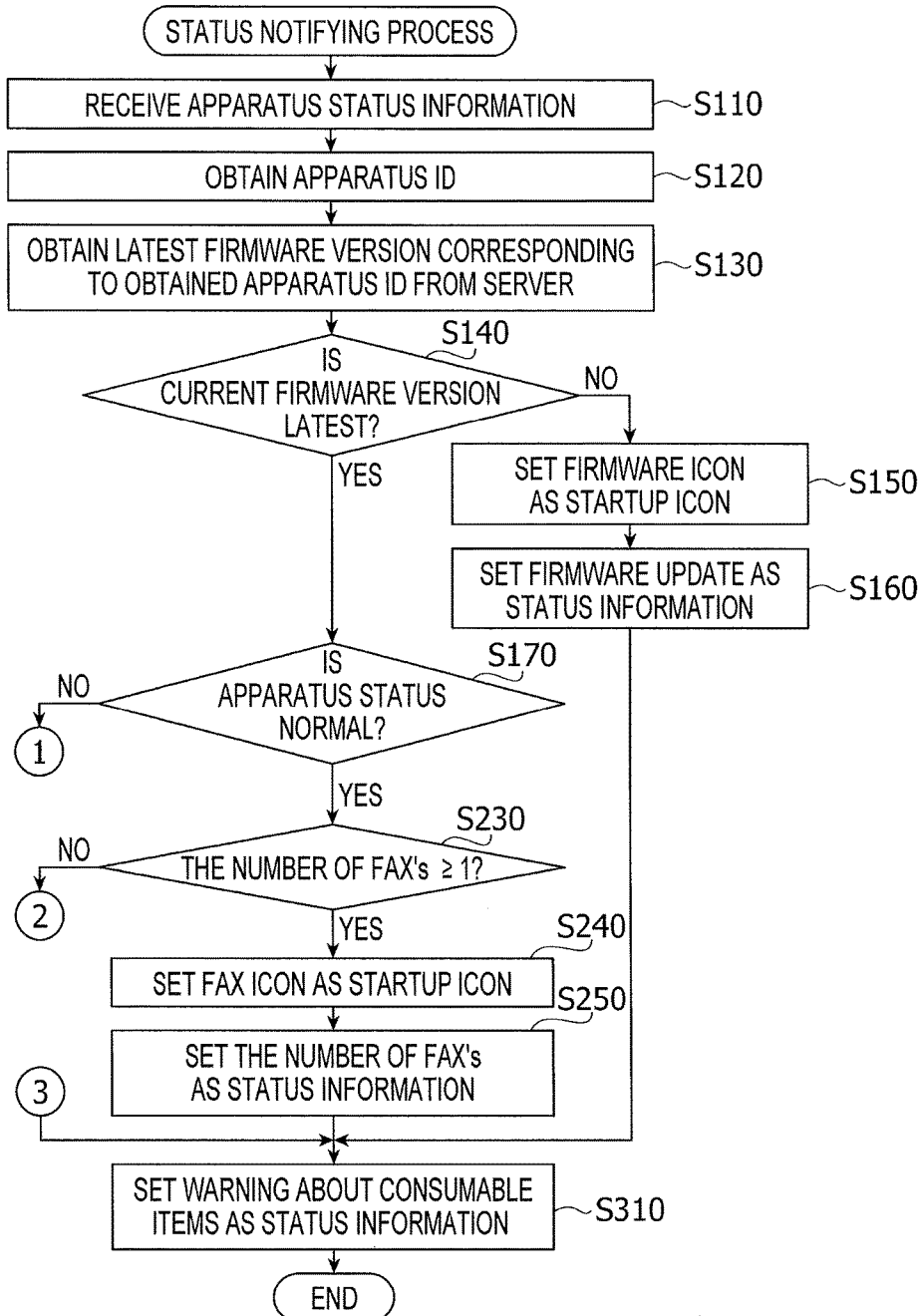
FIGS. 7A-7C show a flowchart illustrating an apparatus status notifying process according to the illustrative embodiment.
Figure 7B:
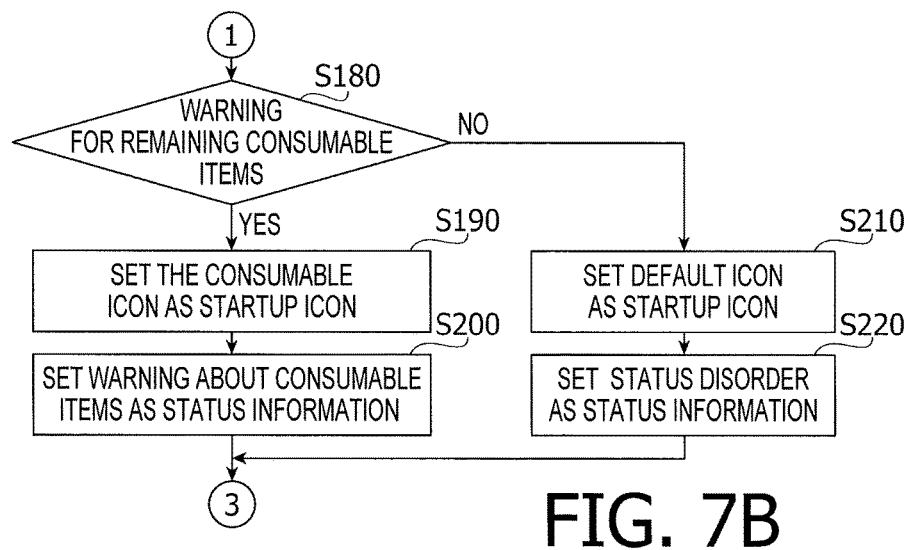
Figure 7C:
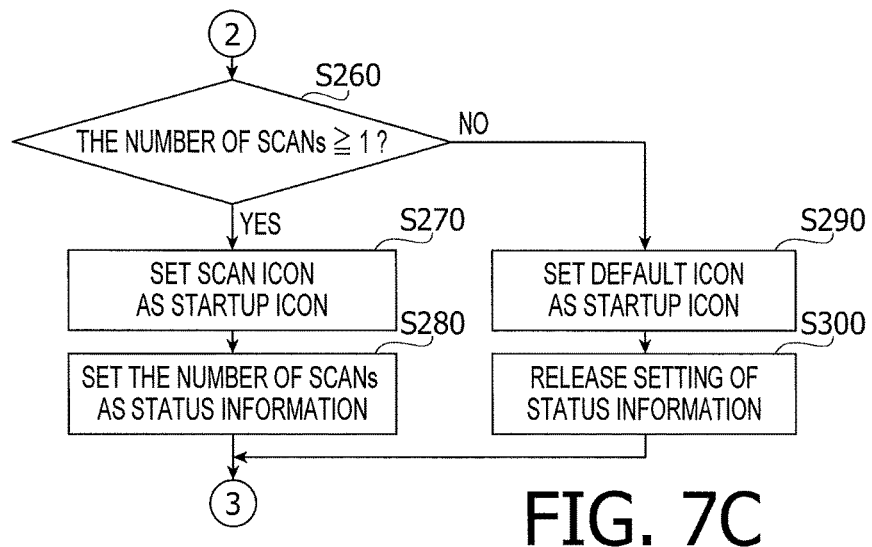

The apparatus status notifying process, which is a process to realize the above-described apparatus status notifying function, will be described in detail, referring to FIGS. 7A-7C. As afore-mentioned, the apparatus status notifying process is a part of the remote use application 27, and is executed when the OS 26 starts up in accordance with the startup reservation.

When the apparatus status notifying process is started, the CPU 11 of the portable terminal 10 obtains the information, which is stored as the apparatus status information table 47, from the MFP 30 through the second wireless communication device 22 (S110). Then, in S120, the CPU 11 obtains the apparatus ID from the apparatus status information obtained in S110.

In S130, the CPU 11 accesses the server 160, and obtains the latest firmware version corresponding to the apparatus ID obtained in S120 from the server 160. In S140, the CPU 11 determines whether the current version of the firmware 46 stored in the MFP 30 is the newest. Specifically, the CPU 11 determines whether the firmware version included in the apparatus status information obtained in S110 is equal to the latest firmware version obtained from the server 160 in S130.

When it is determined that the current version of the firmware 46 of the MFP 30 is equal to the newest firmware version, the CPU 11 proceeds to S170. When it is determined that the current version of the firmware 46 of the MFP 30 is older than the newest firmware version, the CPU 11 proceeds to S150. In S150, the CPU 11 sets the startup icon 50 displayed on the display device 15 to the firmware icon 50e as shown in FIG. 6E. It is noted that the term "set" above means storing icon switching information indicating the icon to be displayed as the startup icon 50 in the storage 12 or a memory card attached to the memory card I/F 13. The same term "set" used in steps S190, S210, S240, S270 and S290 has the same meaning.

Therefore, in S150, in order to display the firmware icon 50e as the startup icon 50, the icon switching information indicating the firmware icon 50e is stored in the storage 12 or the memory card attached to the memory card I/F 13.

In S160, the CPU 11 sets firmware update as the status information, and the CPU 11 proceeds to S310. It is noted that the term "set" used here means storing information in the storage 12 or the memory card attached to the memory card I/F 13. The term "set" used in S200, S220, S250 and S280 has the same meaning.

Therefore, in S160, the CPU 11 stores the information indicating the firmware update in the storage 12 or the memory card of the memory card I/F 13 as the status information.

In S310, the CPU 11 executes a displaying process to display the startup icon 50 and the status icon 60. When the CPU 11 proceeds to S310 via S150 and S160, the CPU 11 executes step S310 based on the information set in S150 and S160. Specifically, the CPU 11 instructs the OS 26 to change the startup icon 50 displayed on the display device 15 to the firmware icon 50e set in S150, and display the firmware warning icon 60e corresponding to the firmware update which is the status information set in S160 as the status icon 60. According to the above control, the firmware icon 50e is displayed as the startup icon 50 and the firmware warning icon 60e is overlaid on the firmware icon 50e. After execution of S310, the CPU 11 terminates the apparatus status notifying process.

Figure 8A:
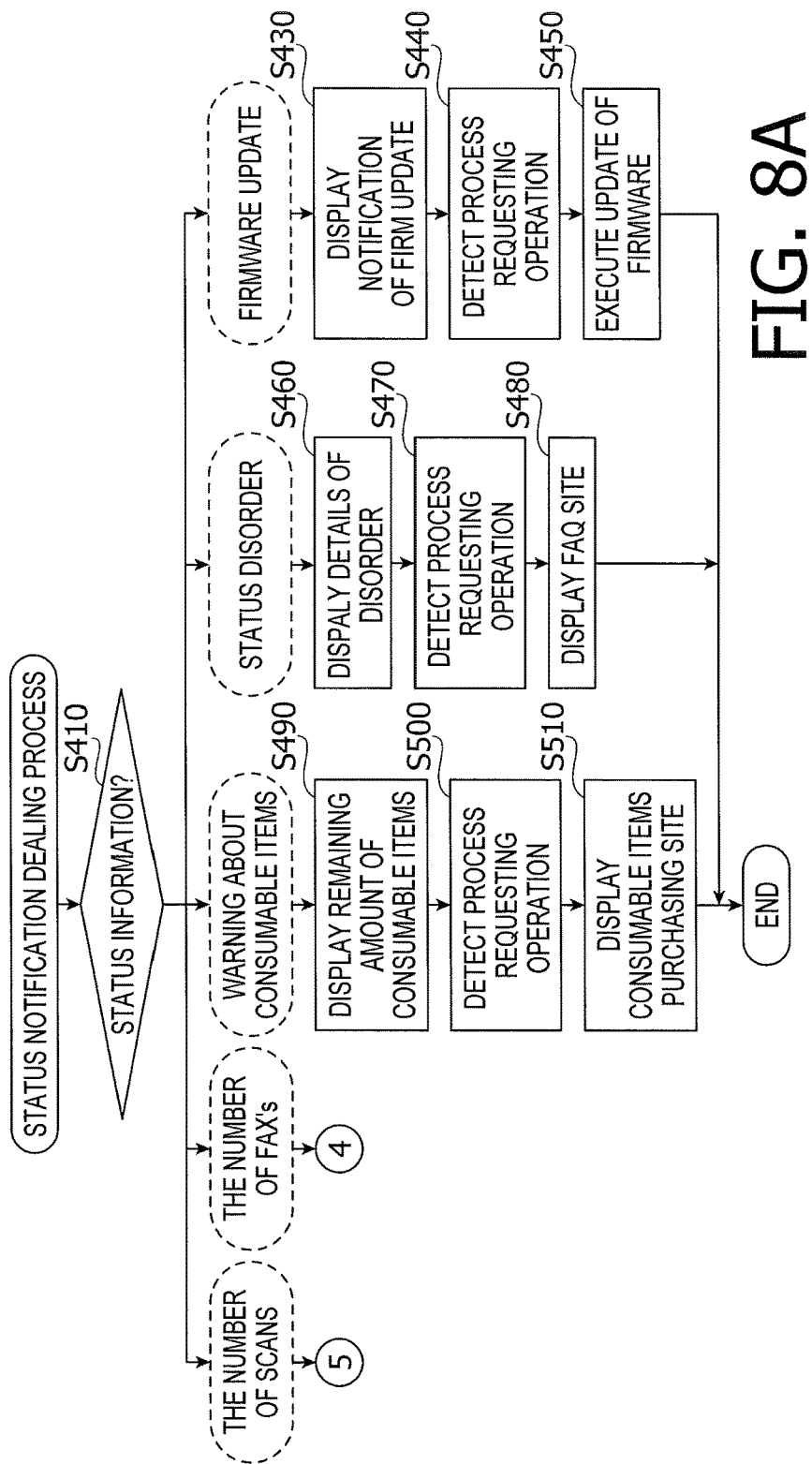
FIGS. 8A-8C show a flowchart illustrating a status notification dealing process according to the illustrative embodiment.
Figure 8B:
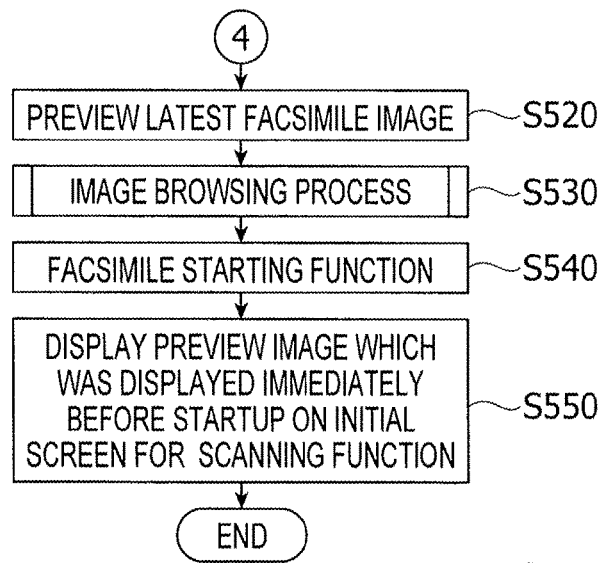
Figure 8C:
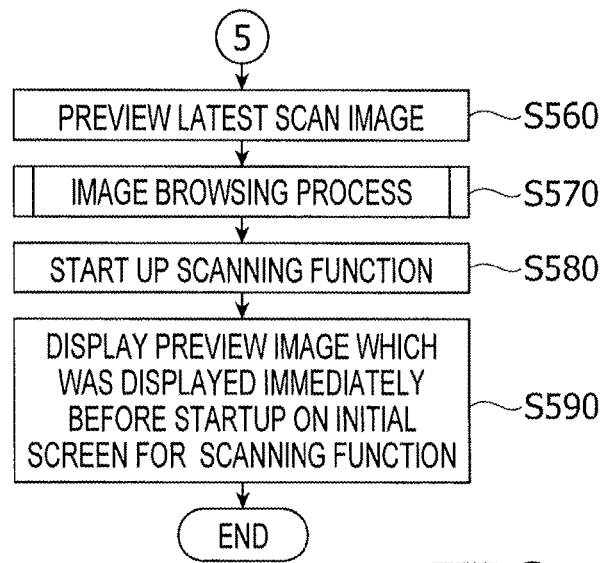

When the status icon 60 is overlaid on the startup icon 50 in the apparatus status notifying process, and thereafter, in response to the pressing operation with respect to the startup icon 50, or in response to the indicating operation or the pressing operation with respect to the status icon 60, the remote use application 27 is started up, and the status notification dealing process shown in FIGS. 8A-8C is executed. After the status notification dealing process is started, the apparatus status notifying process shown in FIGS. 7A-7C may be not executed until the standby screen shown in FIG. 4 is displayed on the display device 15.

When it is determined that the current firmware version is the latest (S140: YES) and the CPU 11 proceeds to S170, the CPU 11 determines whether the status of the MFP 30 is normal based on the status information included in the apparatus status information obtained in S110. The status information includes a status code which is an integer value, and a character string. When the status code is "0", the status is determined to be normal. When the status code is not "0", the status is determined to be abnormal. Therefore, the status information shown in FIGS. 2A and 2B indicates that the status is normal since the codes are "0". In contrast, the status information shown in FIG. 2C indicates that the status is abnormal since the status conde is not "0".

When the status is normal (S170: YES), the CPU 11 proceeds to S230. When the status is abnormal (S170: NO), the CPU 11 proceeds to S180. In S180, the CPU 11 determines whether the contents of the status abnormality is the warning regarding the remaining amount of the consumables. When it is determined that the contents of the abnormality is not the warning regarding the remaining amount of the consumables (S180: NO), that is, when there occurs an abnormality other than shortage of the remaining amount of the consumables, the CPU 11 proceeds to S210.

In S210, the startup icon 50 displayed on the display device 15 is set to the default icon 50a as shown in FIG. 6A. Then, in S220, the CPU 11 sets the status abnormality as the status information and proceeds to S310.

When the CPU 11 proceeds to S310 after execution of S210 and S220, the CPU 11 executes a process based on the information set in S210 and S220. Specifically, the CPU 11 instructs the OS 26 to change the startup icon 50 displayed on the display device 15 to the default icon 50a set in S210, and displays the status warning icon 60a corresponding to the status abnormality which is the status information set in S220 as the status icon 60. With the above control, the default icon 50a is displayed as the startup icon 50 and the status warning icon 60a is overlaid on the default icon 50a on the display device 15.

When the contents of the status abnormality is a warning regarding the remaining amount of the consumables (S180: YES), that is the remaining amount of the consumables is equal to or less than a particular level, the CPU 11 proceeds to S190. In S190, the CPU 11 sets the startup icon 50 displayed on the display device 15 to the consumable icon 50d as shown in FIG. 6D. Then, in S200, the CPU 11 sets the consumable warning as the status information and proceeds to S310.

When the CPU 11 proceeds to S310 via S190 and S200, the CPU 11 executes a process based the information set in S190 and S200. That is, the CPU 11 instructs the OS 26 to change the startup icon 50 to the consumable icon 50d set in S190, and displays a consumable warning icon 60d corresponding to the consumable warning which is the status information set in S200 as the status icon 60. With this control, on the display device 15, the consumable icon 50d is displayed as the startup icon 50 and the consumable warning icon 60d is overlaid on the consumable icon 50d.

When it is determined that the apparatus status is normal (S170: YES) and the CPU 11 proceeds to S230, the CPU 11 determines whether the number of faxes is one or more based on the number of faxes included in the apparatus status information obtained in S110. When it is determined that the number of faxes is "0" (S230: NO), the CPU 11 proceeds to S260. When it is determined that the number of faxes is "1" or more (S230: YES), the CPU 11 proceeds to S240.

In S240, the CPU 11 sets the startup icon 50 displayed on the display device 15 to a fax icon 50b as shown in FIG. 6B. Then, in S250, the CPU 11 sets the number of faxes as the status information, and proceeds to S310.

When the CPU 11 proceeds to S310 via S240 and S250, the CPU 11 executes a process based on the information set in S240 and S250. That is, the CPU 11 instructs the OS 26 to change the startup icon 50 displayed on the display device 15 to the fax icon 50b set in S240, and displays the number of faxes icon 60b representing the number of faxes, which is the status information set in S250. With the above control, on the display device 15, the fax icon 50b is displayed as the startup icon 50 and the number of faxes icon 60b is overlaid on the fax icon 60b.

When the number of faxes is "0" (S230: NO), the CPU 11 proceeds to S260 and determines whether the number of scans is "1" or more based on the number of scans included in the apparatus status information obtained in S110. When it is determined that the number of scans is "0" (S260: NO), the CPU 11 proceeds to S290. When it is determined that the number of scans is "1" or more (S260: YES), the CPU 11 proceeds to S270.

In S270, the CPU 11 sets the startup icon 50 displayed on the display device 15 to the scan icon 50c as shown in FIG. 6C. Then, in S280, the CPU 11 sets the number of scans as the status information, and proceeds to S310.

When the CPU 11 proceeds to S310 via S270 and S280, the CPU 11 executes a process based on the information set in S270 and S280. That is, the CPU 11 instructs the OS 26 to change the startup icon 50 displayed on the display device 15 to the scan icon 50c set in S270, and displays the number of scans icon 60c representing the number of scans, which is the status information set in S280. With the above control, on the display device 15, the scan icon 50c is displayed as the startup icon 50 and the number of scans icon 60c is overlaid on the scan icon 60c.

When the number of scans is "0" (S260: NO), the CPU 11 proceeds to S290 and sets the startup icon 50 displayed on the display device 15 to the default icon 50a as shown in FIG. 6A. Then, in S300, the CPU 11 releases setting of the status information and proceeds to S310. It is noted that "release of setting" in S300 means deletion of the status information stored in the storage 12 or the memory card attached to the memory card I/F 13.

When the CPU 11 proceeds to S310 via S290 and S300, the CPU 11 executes a process based on the information set in S290 and in accordance with release of status information in S300. That is, the CPU 11 instructs the OS 26 to change the startup icon 50 displayed on the display device 15 to the default icon 50a set in S290. Further, the CPU 11 instructs the OS 26 to delete the status icon 60 in accordance with release of the status information in S300. As a result, the default icon 50a is displayed on the display device 15, while the status icon 60 is not displayed on the display device 11. That is, the display is in the default status as shown in FIG. 4.

(4) Status Notification Dealing Process

When the status icon 60 is overlaid on the startup icon 50, in response to the pressing operation with respect to the startup icon 50, or in response to the indication operation or the pressing operation with respect to the status icon 60, the remote use application 27 is started up and the status notification dealing process shown in FIGS. 8A-8C is executed.

When the status notification dealing process is started, the CPU 11 checks currently set status information, that is the information stored in the storage 12 or the memory card attached to the memory cart I/F 13 in S410. It is noted that the status information is set, as mentioned above, in S160, S200, S220, S250 or S280.

When the currently set status information is the firmware update, the CPU 11 proceeds to S430. In S430, the CPU 11 executes a firmware update notification display. That is, the CPU 11 displays information indicating that the firmware can be updated on the display device 15. It is noted that how and where the information is to be displayed within a display area of the display device 15 can be determined arbitrarily. For example, as in the preview image shown in FIG. 5B, the information may be popped up in the vicinity of the startup icon 50. So is in S460 and S490 describe later.

It is noted that, as the information displayed in the firmware update notification display, for example, at least one of the currently installed firmware version and the latest firmware version may be displayed.

When the CPU 11 detects that a process requesting operation is performed in S440 after the firmware update notification display is executed in S430, the CPU 11 proceeds to S450. It is noted that the process requesting operation is a particular operation to cause the process which has been set for the currently occurred particular status. Concrete contents of the process requesting operation may be determined arbitrarily. For example, the process requesting operation includes a tapping operation with respect to the status icon 60, and a tapping operation with respect to an image displayed according to the firmware update notification display in S430.

In S450, the CPU 11 executes updating of the firmware. Specifically, the CPU 11 instructs the MFP 30, via the wireless communication, to update the firmware 46. Then, in the MFP 30, downloading of the newest firmware and the updating process are executed.

When it is determined that the currently set status information is the status abnormality, the CPU 11 proceeds to S460. In S460, the CPU 11 executes an abnormality detail display. Specifically, in S460, information concretely indicating the abnormality status currently occurring in the MFP 30 is displayed on the display device 15.

After executing the abnormality detail display in S460, when it is detected that the process requesting operation is performed in S470, the CPU 11 proceeds to S480. In S480, the CPU 11 accesses an FAQ (frequently asked questions) site related to the currently occurring status abnormality, and displays the FAQ site on the display device 15. Then, the user can recognize how to deal with the currently occurring status abnormality easily and efficiently.

The address of the FAQ site may be included, in advance, in the remote use application 27 as a part thereof, or stored in the MFP 30 and received therefrom in S130. Alternatively or optionally, the address of the FAQ site may be obtained by accessing the server 160 or another particular information processing apparatus and inquiring an appropriate address of the FAQ site corresponding to the currently occurring status abnormality.

When it is determined, in S410, that the currently set status information is the consumable warning, the CPU 11 proceeds to S490. In S490, the CPU 11 executes a consumable remaining amount display. Specifically, the CPU 11 displays information indicating the consumables, of which remaining amounts are equal to or less than particular level, on the display device 15. At this stage, additional information such as the remaining amounts of the respective consumables and the like may be obtained from the MFP 30 and displayed on the display device 15. It is noted that such additional information may be obtained, in advance, at a particular timing at a time when S130 is executed or thereafter.

After the consumable remaining amount display is executed, when it is detected, in S500, that the process requesting operation is performed, the CPU 11 proceeds to S510. In S510, the CPU 11 accesses the consumable purchasing site at which the consumables of which remaining amounts are equal to or less than particular level can be purchased online, and displays the consumable purchasing site on the display device 15. With this control, the user can purchase online the consumables of which remaining amounts are relatively small quickly and efficiently.

The address of the consumable purchasing site may be included, in advance, in the remote use application 27 as a part thereof, or stored in the MFP 30 and received therefrom in S130. Alternatively or optionally, the address of the consumable purchasing site may be obtained by accessing the server 160 or another particular information processing apparatus and inquiring an appropriate address of the consumable purchasing site corresponding to the currently occurring status abnormality.

When it is determined, in S410, that the currently set status information is the number of faxes, the CPU 11 proceeds to S520. In S520, the CPU 11 displays preview images 70 of the latest facsimile data from among the multiple pieces of facsimile data counted in the MFP 30 as the number of faxes on the display device 15. It is noted that the data of the preview image 70 may be obtained from the MFP 30 in S520, or may be obtained, in advance, at a particular timing, in advance, when S130 is executed or thereafter. Further, regarding the data of the preview image 70, not only the latest facsimile data, but also all the pieces of the facsimile data counted as the number of faxes may be obtained.

Figure 9:
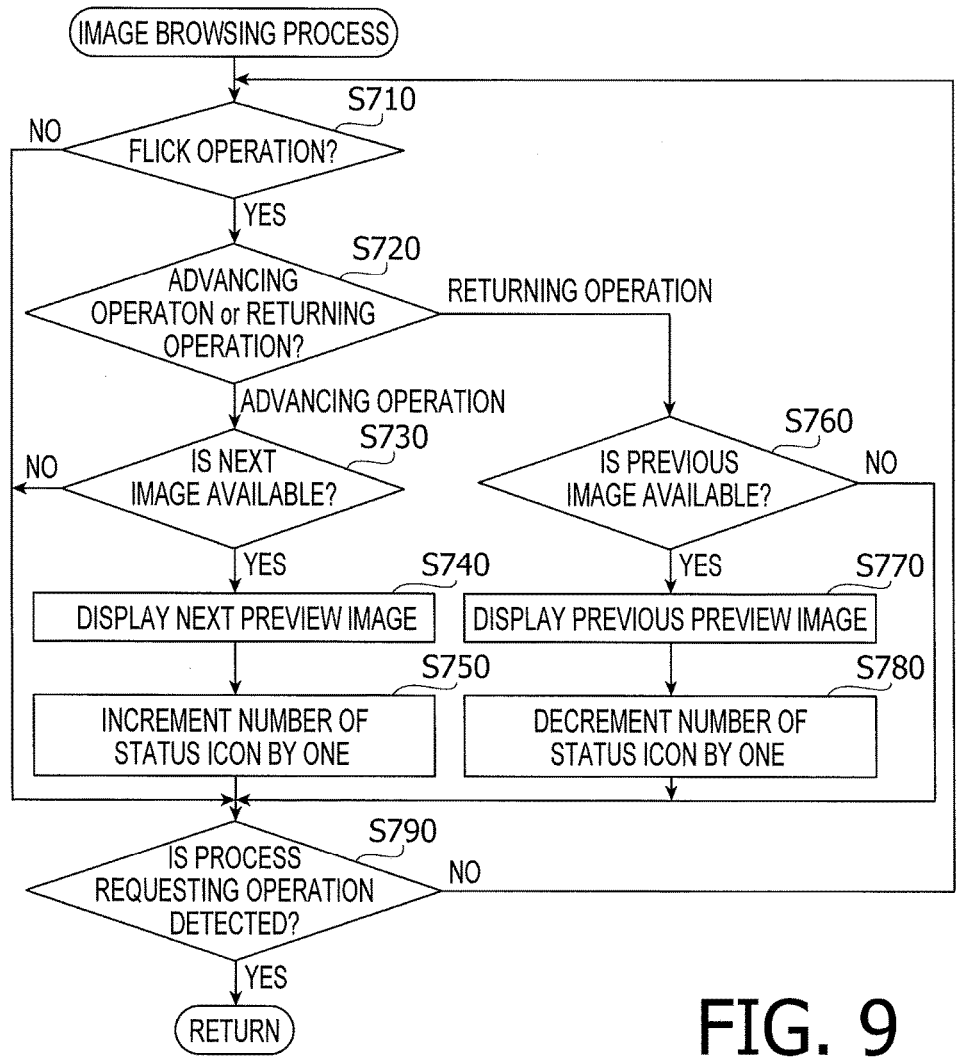
FIG. 9 is a flowchart illustrating an image browsing process which is called in the status notification dealing process shown in FIGS. 8A-8C.

In S530, an image browsing process is executed. The image browsing process is shown in FIG. 9. In S710, the CPU 11 determines whether a flick operation through the indicator is performed. When it is determined that the flick operation is not performed (S710: NO), the CPU 11 proceeds to S790. When it is determined that the flick operation is performed (S710: YES), the CPU 11 proceeds to S720.

In S720, it is determined whether the flick operation is a advancing operation or a returning operation. It is noted that the returning operation is an operation to switch the currently displayed preview image 70 to an older preview image 70 by one image. It is also noted that the term "older" referred to above means that the date and time at which the preview image was received and stored in the storage 32 is older. An example of the returning operation is, for example, the flick operation in a particular returning direction (e.g., leftward on the screen) with respect to the preview image 70 currently displayed on the display device 15.

It is noted that the advancing operation is an operation to switch the currently displayed preview image 70 to a newer preview image 70 by one image. It is also noted that the term "newer" referred to above means that the date and time at which the preview image was received and stored in the storage 32 is newer. An example of the advancing operation is, for example, the flick operation in a particular advancing direction (e.g., rightward on the screen) with respect to the preview image 70 currently displayed on the display device 15.

When it is determined that the flick operation is the returning operation, the CPU 11 proceeds to S760. In S760, the CPU 11 determines whether there exists a previous image, or the older image than the preview image 70 currently displayed. When the previous image does not exist, the CPU 11 proceeds to S790. When the previous image exists, the CPU 11 proceeds to S770.

In S770, the CPU 11 switches the preview image 70 to be displayed on the display device 15 from the currently displayed preview image 70 to the previous preview image 70. It is noted that, at every occurrence of the returning operation, the previous preview image 70 is obtained from the MFP 30 and displayed on the display device 15. In S780, the CPU 11 decrements the value of the status icon 60 by one.

When it is determined, in S720, that the flick operation is the advancing operation, the CPU 11 proceeds to S730, where the CPU 11 determines whether there exists an image newer than the currently displayed preview image 70. When it is determined that there does not exist a next image (S730:

NO), the CPU 11 proceeds to S790. When it is determined that there exists the next image (S730: YES), the CPU 11 proceeds to S740.

In S740, the CPU 11 switches the preview image 70 to be displayed on the display device 15 from the currently displayed preview image 70 to the next preview image 70. It is noted that, at every occurrence of the advancing operation, the next preview image 70 is obtained from the MFP 30 and displayed on the display device 15. In S750, the CPU 11 increments the value of the status icon 60 by one.

In S790, the CPU 11 determines whether the process requesting operation is executed. When it is determined that the process requesting operation is not executed (S790: NO), the CPU 11 returns to S710. When it is determined that the process requesting operation is executed (S790: YES), the CPU 11 proceeds to S540 (see FIG. 8B).

In S540, the CPU 11 starts up the facsimile function among the multiple functions the remote use application 27 has. As the facsimile function is started up, an initial screen of the facsimile function is displayed on the display device 15.

In S550, on the initial screen of the facsimile function, the preview image 70, which was displayed immediately before the process requesting operation was performed, is displayed. When the initial screen of the facsimile function is displayed, the aforementioned facsimile function can be executed using the initial screen as a starting point.

When it is determined, in S410, that the currently set status information is the number of scans, the CPU 11 proceeds to S560. In S560, the CPU 11 displays the preview image of the latest scan data from among the multiple pieces of scan data counted as the number of scans in the MFP 30 on the display device 15. It is noted that the data of the preview image may be obtained from the MFP 30 in S560, or at a particular timing, in advance, when S130 is executed or thereafter. Further, when the preview image data is obtained, the data corresponding to not only the latest piece of the scan data, but all the pieces of the scan data may be obtained.

In S570, the CPU 11 executes the image browsing process as in S530. The image browsing process in S570 is the same as that in S530, which was described referring to FIG. 9, except that the image to be processed is the preview image of the scan data. When the process requesting operation is performed in the image browsing process in S570, the CPU 11 proceeds to S580.

In S580, the CPU 11 starts up the scanning function among the multiple functions the remote use application 27 has. As the scanning function is started up, an initial screen for the scanning function is displayed on the display device 15.

In S590, on the initial screen of the scanning function, the preview image 70, which was displayed immediately before the process requesting operation was performed, is displayed. When the initial screen of the scanning function is displayed, the aforementioned scanning function can be executed using the initial screen as a starting point.

(5) Effects of Illustrative Embodiment

According to the above-described illustrative embodiment, the following effects can be obtained. In the portable terminal 10, as the startup icon 50 to start the remote use application 27, the default icon 50a is generally displayed on the standby screen. In contrast, when the apparatus status notifying function, which is one of the multiple functions the remote use application 27 has, is executed in accordance with the startup reservation, if a particular status is occurring in the MFP 30, the startup icon 50 is set to another function icon corresponding to the particular status of the MFP 30, and further the status icon 60 indicating the particular status is also displayed.

Therefore, according to the remote use application 27 described above, when a particular status occurs in any one of the multiple functions the MFP 30 has, the user can easily recognize to which function the occurred particular status is related, with the standby screen being displayed on the display device 15 of the portable terminal 10.

In response to the pressing operation with respect the startup icon 50, or in response to the indicating operation or the pressing operation with respect to the status icon 60, the particular status image indicating the contents of the particular status is displayed. As understood form S430, S460, S490, S520 and S560, the concrete contents of the particular status image are different depending of the occurred particular statuses. For example, when the number of faxes icon 60*b* is displayed (see FIG. 5A) as the status icon 60, the preview image 70 as shown in FIG. 5B is displayed as the particular status image. Therefore, when the particular status has occurred in the MFP 30, the user can recognize the concrete contents of the particular status with a relatively simple operation through the standby screen.

According to the illustrative embodiment, the priority is assigned to the firmware management function, the status monitoring function, the facsimile function and the scanning function, in this order. When the particular statuses have occurred in multiple different functions simultaneously, switching of the startup icon 50 and displaying of the status icon 60 are executed with respect to the function having the highest priority. Therefore, the user can recognize the information related to the particular status currently occurring and having the higher priority easily and efficiently. It is noted that the fixed priority may be assigned, in advance, to each of the particular statuses, or the user may be allowed to arbitrarily change the priorities of respective functions.

The MFP 30 according to the illustrative embodiment has the facsimile function as one of the multiple functions. Further, the remote use application 27 displays the number of faxes icon 60*b* indicating the number of faxes as the status icon 60 when the particular status in which the number of faxes is equal to 1 or more.

Thus, the user can recognize that the MFP 30 has received new facsimile data as the startup icon 50 has changed to the fax icon 50*b*. Further, the user recognizes the number of the faxes as the number of faxes icon 60*b* is displayed as the status icon 60.

In response to pressing operation with respect to the fax icon 50*b* as the startup icon 50, or in response to indicating operation or the pressing operation with respect to the number of faxes icon 60*b*, the preview image 70 of the facsimile data is popped up as shown in FIG. 5B. In this state, by applying a flick operation to the preview image 70, the user can switch the preview images 70. Accordingly, the user can recognize the contents of the newly received facsimile data with a relatively simple operation.

The MFP 30 according to the illustrative embodiment has the scanning function as one of the multiple functions. When the particular status where the number of scans is one is occurring, the remote use application 27 displays the number of scans icon 60*c* indicating the number of scans as the status icon 60.

Thus, the user can recognize that the MFP 30 has newly received the original as the startup icon 50 is changed to the scan icon 60*c*. Further, since the number of scans icon 60*c* is displayed as the status icon 60, the user can easily recognize the number of scans based thereon.

In response to the pressing operation with respect to the scan icon 50*c*, which serves as the startup icon 50, or in response to the indication operation or the pressing operation with respect to the number of scans icon 60*c* as the status icon 60, the preview image of the scan data is popped up (see FIG. 5B) similar to the popup image 70 of the facsimile data. Further, by applying the flick operation to the preview image, the user can switch the preview images. Accordingly, the user can recognize the contents of the newly generated scan data quickly with a relatively simple operation.

The MFP 30 according to the illustrative embodiment has the firmware management function as one of the multiple functions the remoted use application 27 has. The firmware management function includes a function of updating the firmware 46. When a particular status, in which there exists the firmware of which version is newer than that of the firmware currently installed in the MFP 30, and when the firmware installed in the MFP 30 can be updated to the firmware of the latest version, is occurring, the remote use application 27 displays the firmware warning icon 60*e* as the status icon 60.

Therefore, the user can recognized that the firmware 46 installed in the MFP 30 can be updated to the latest version, as the startup icon 50 has changed to the firmware icon 50*e*. Further, as the firmware warning icon 60*e* is displayed as the status icon, the user recognizes that the firmware can be updated.

In response to the pressing operation with respect to the firmware icon 50*e* as the startup icon 50, or in response to the indicating operation or the pressing operation with respect to the firmware warning icon 60*e* as the status icon 60, a notification of update of the firmware is displayed (S430). Therefore, the user can recognize that the firmware 46 can be updated, with a relatively simple operation.

Further, after execution of the firmware update notification display (S430), by executing a process requesting operation (S440), it is possible to instruct the MFP 30 to update the firmware 46.

The MFP 30 according to the illustrative embodiment has the status monitoring function as one of the multiple functions. The status monitoring function includes a function to monitor the remaining amount of the consumables and execute a warning process when the remaining amount of the consumable becomes equal to or less than the particular level. The remote use application 27 is configured to display the status warning icon 60*a* when the status abnormality is occurring in the MFP 30 and the contents of the abnormality is one other than the shortage of the remaining amount of the consumables, the CPU 11 displays the status warning icon 60*a* as the status icon 60.

Thus, the user can recognize that the status abnormality other than the shortage of the consumables has occurred in the MFP 30 as the status warning icon 60*a* is displayed as the status icon 60.

In response to the pressing operation with respect to the default icon 50*a* as the startup icon 50, or in response to the indicating operation or the pressing operation with respect to the status warning icon 60*a* as the status icon 60, the abnormality detail display is executed (S460). Thus, the user can recognize the occurrence of the abnormality in the MFP 30 and the details thereof, quickly with a relatively simple operation.

Further, after the abnormality detail display is executed, by performing the particular process requesting operation (S470), the FAQ site related to the currently occurring status abnormality can be displayed on the display device 15.

When the status abnormality is shortage of the remaining amount of the consumables, the remote use application 27 displays the consumable warning icon 60d as the status icon 60. Because of the above configuration, the user can recognize that the currently occurring abnormal status is related to the consumables of the MFP 30 since the startup icon 50 is switched to the consumable icon 50d, and the user can also recognize that shortage of the remaining amount of the consumables is occurring since the consumable warning icon 60d is displayed as the status icon 60.

In response to the pressing operation with respect to the consumable icon 50d as the startup icon 50, or in response to the indicating operation or the pressing operation with respect to the consumable warning icon 60d as the status icon 60, the consumables remaining amount display (S490) is executed. As a result, the user can quickly recognize the shortage of remaining amount of which consumable is occurring with a simple operation.

Further, according to the illustrative embodiment, after the consumable remaining amount display is executed, by performing a particular process requesting operation (S500), the consumable purchasing site from which the consumables of which remaining amount is equal to or less than the particular level can be purchased online can be displayed on the display device 15.

Other Embodiments

It is noted that the aspects of the present disclosures need not be limited to the above-describe illustrative embodiment, but various modification may be considered and realized.

(1) According to the above-described illustrative embodiment, when the status abnormality other than the shortage of the remaining amount of the consumables has occurred, the default icon 50a is displayed as the startup icon 50. This configuration may be modified such that an icon different from the default icon 50a may be displayed as the startup icon 50.

That is, when the particular status has occurred in the MFP 40, whether the default icon 50a is displayed or another icon corresponding to the particular status is displayed as the startup icon 50 may be arbitrarily determined.

(2) It is noted that the icons shown in FIGS. 6A-6F as the startup icons and the status icons are only examples and ones different from the icons shown in FIGS. 6A-6F may be used. Further, the size and the location of the status icon 60 relative to the startup icon 50 may be arbitrarily determined.

(3) When different particular statuses are occurring in different functions simultaneously, switching of the startup icon 50 and displaying of the status icon 60 are executed with respect to one function of which priority is the highest, according to the above-described illustrative embodiment. Further, the priorities are assigned to the firmware management function, the status monitoring function, the facsimile function and the scanning function in this order. It is noted that the above order of the priority is only an example, and the order of the priority may be arbitrarily determined.

Alternatively, the order of the priority may not be defined. That is, when the particular statuses occur in relation to the multiple functions simultaneously, multiple status icons respectively corresponding to the multiple functions may be displayed simultaneously. In such a case, in response to the indication operation with respect to the one of the multiple status icons 60, the particular displaying process related to the operated icon may be executed.

(4) In the illustrative embodiment described above, as examples of the particular status, a case where a status abnormality if occurring, a case where the firmware can be updated, a case where the number of faxes is counted to be one or more, and a case where the number of scans is counted to be one or more. These statuses are only examples, and any other possible abnormalities should be taken into account.

(5) In the above-described illustrative embodiment, the portable terminal 10 is described as an example of the information processing apparatus. It is noted that the aspects of the present disclosures can be applied to information processing apparatuses other than the portable terminal 10. Further, the MFP 30 is described as an example of the image processing apparatus. It is noted that aspects of the present disclosures can be applied to image processing apparatuses other than the MFP 30.

(6) An execution subject of the indicating operation and the pressing operation based on the detection signal output by the touch panel 14a need not be limited to the OS 26. For example, the remote use application 27 may be configured to detect the operation position of the indicator based on the detection signal from the touch panel 14a. Similarly, regarding displaying of images on the display device 15, it is not necessarily be limited to a configuration of displaying the image through the OS 26. For example, the remote use application 27 may be configured to display images on the display device 15 without interposing the OS 26.

(7) Further, a function realized by one component in the illustrative embodiment may be realized by a plurality of components, or functions realized by a plurality of components in the illustrative embodiment may be realized by an integrated single component. Further, at least a part of components in the illustrative embodiment may be replaced with known configuration having the same function. A part of the configuration according to the illustrative embodiment may be omitted. Furthermore, at least a part of the configuration of the illustrative embodiment may replace a similar configuration of other embodiments, and at least a part of the configuration of the illustrative embodiment may be added to other configuration.

(8) Aspects of the present disclosures may be realized in various ways in addition to the portable terminal 10. That is, the aspects of the disclosures may be realized by a system including the portable terminal 10 described as a component thereof, computer-readable instructions which cause a computer to function as the portable terminal 10 described above, a non-transitory recording medium storing containing such instructions, a remote use method employed in the portable terminal 10 described above, and the like.

What is claimed is:

1. A non-transitory recording medium storing computer-readable instructions which cause, when executed by a controller of a computer, a function execution process of an information processing apparatus, the computer being provided with a display device having an image displaying area, a touch panel configured to detect a first operation and a second operation with respect to the displaying area of the display device discriminatingly from each other, a wireless communication interface configured to execute wireless communication with an image processing apparatus, the first operation being at least one of in contact with and in close proximity to the touch panel, the second operation being pressing of the touch panel by the indicator at a particular strength or more, the information processing apparatus is configured to display a startup icon on the display area of the display device, the function execution process being started in response to the first operation with respect to the startup icon, a default icon being initially set to the startup icon, the instructions, when executed by the controller, causing the information processing apparatus to:

receive function information from the image processing apparatus by executing wireless communication through the wireless communication interface, the function information indicating multiple functions of the image processing apparatus;

when a particular status is occurring in relation to at least one of the multiple functions indicated by the received function information, receive particular status information from the information processing apparatus by executing wireless communication through the wireless communication interface, without requiring a specific operation of the startup icon to receive the particular status information for each received particular status information, the particular status information indicating the particular status of the image processing apparatus and switch the display of the startup icon displayed on the display device to a function icon indicating a function corresponding to the received particular status information and a status icon indicating the particular status represented by the received particular status information.

2. The non-transitory recording medium according to claim 1, wherein the instructions further cause the information processing apparatus to:

in response to detection of the second operation with respect to the function icon, display a particular status image indicating contents of the particular status on the display device.

3. The non-transitory recording medium according to claim 1, wherein the instructions further cause the information processing apparatus to:

in response to detection of the first operation with respect to the status icon, display a particular status image indicating contents of the particular status on the display device.

4. The non-transitory recording medium according to claim 1, wherein the instructions further cause the information processing apparatus to:

in response to detection of the second operation with respect to the status icon, display a particular status image indicating contents of the particular status on the display device.

5. The non-transitory recording medium according to claim 1, wherein the multiple functions are assigned with priority order, wherein the instructions further cause the information processing apparatus to:

when two or more pieces of particular status information respectively corresponding to two or more functions of the multiple functions are received, switch the default icon to the function icon indicating a target function which is a function having a highest priority among the two or more functions, and display the status icon corresponding to the target function together with the function icon.

6. The non-transitory recording medium according to claim 1, wherein the image processing apparatus has a facsimile receiving function to receive facsimile data and store the received facsimile data as one of the multiple functions, wherein the particular status corresponding to the facsimile receiving function is a status where the facsimile data is newly received and stored, and wherein the status icon corresponding to the facsimile receiving function includes image indicating the number of pieces of received and stored facsimile data.

7. The non-transitory recording medium according to claim 1, wherein the image processing apparatus has a scanning function to scan an image on an original and store the scanned image as one of the multiple functions, wherein the particular status corresponding to the scanning function is a status where the scanned data is newly generated and stored, and wherein the status icon corresponding to the scanning function includes image indicating the number of pieces of scanned and stored facsimile data.

8. The non-transitory recording medium according to claim 1, wherein the image processing apparatus has a firmware updating function to update a firmware of the image processing apparatus as one of the multiple functions, wherein the particular status corresponding to the firmware updating function is a status where there exists a newer firmware of which version is newer than the version of a current firmware the image processing device has and the current firmware can be updated to the newer firmware, and wherein the status icon corresponding to the firmware updating function includes an update notifying image indicating that the current firmware can be updated to the newer firmware.

9. The non-transitory recording medium according to claim 1, wherein the image processing apparatus has an abnormality detecting function to detect a particular abnormal status in the image processing apparatus as one of the multiple functions, wherein the particular status corresponding to the abnormality detecting function is a status where the abnormal status is occurring in the image processing apparatus, and wherein the status icon corresponding to the abnormality detecting function includes an abnormality notifying image indicating that the abnormal status is occurring.

10. The non-transitory recording medium according to claim 1, wherein the instructions further cause the information processing apparatus to execute a particular process which was determined in advance to correspond to the particular status indicated by the status icon when a particular operation is performed, through the touch panel, with respect to the particular status image or the status icon after the particular status image was displayed.

11. The non-transitory recording medium according to claim 1, wherein the wireless communication interface is configured to execute a wireless LAN communication.

12. The non-transitory recording medium according to claim 11,
wherein the wireless communication interface is further configured to execute the wireless communication through a mobile communication network.

13. An information processing apparatus, comprising:
a display device having an image displaying area;
a touch panel configured to detect a first operation and a second operation with respect to the displaying area of the display device discriminatingly from each other, the first operation being at least one of in contact with and in close proximity to the touch panel, the second operation being pressing of the touch panel by the indicator at a particular strength or more, a wireless communication interface configured to wirelessly communicate with the image processing apparatus; and
a controller
configured to:
display a default icon on the display device as a startup icon to start the function execution process;
receive function information from the image processing apparatus by executing wireless communication through the wireless communication interface, the function information indicating multiple functions of the image processing apparatus;
when a particular status is occurring in relation to at least one of the multiple functions indicated by the received function information, receive particular status information from the information processing apparatus by executing wireless communication through the wireless communication interface, without requiring a specific operation of the startup icon to receive the particular status information for each received particular status information, the particular status information indicating the particular status of the image processing apparatus and switch the display of the startup icon displayed on the display device to a function icon indicating a function corresponding to the received particular status information and a status icon indicating the particular status represented by the received particular status information.

14. The information processing apparatus according to claim 13,
wherein the controller is further configured to:
in response to detection of the second operation with respect to the function icon, display a particular status image indicating contents of the particular status on the display device.

15. The information processing apparatus according to claim 13,
wherein the controller is further configured to:
in response to detection of the first operation with respect to the status icon, display a particular status image indicating contents of the particular status on the display device.

16. The information processing apparatus according to claim 13,
wherein the controller is further configured to:
in response to detection of the second operation with respect to the status icon, display a particular status image indicating contents of the particular status on the display device.

17. A function execution method of an information processing apparatus which is provided with a display device having an image displaying area, a touch panel configured to detect a first operation and a second operation with respect to the displaying area of the display device discriminatingly from each other, a wireless communication interface configured to execute wireless communication with an image processing apparatus, the first operation being at least one of in contact with and in close proximity to the touch panel, the second operation being pressing of the touch panel by the indicator at a particular strength or more,
the method including:
displaying a startup icon on the display area of the display device, the function execution process being started in response to the first operation with respect to the startup icon, a default icon being initially set to the startup icon;
receiving function information from the image processing apparatus by executing wireless communication through the wireless communication interface, the function information indicating multiple functions of the image processing apparatus;
when a particular status is occurring in relation to at least one of the multiple functions indicated by the received function information, receiving particular status information from the information processing apparatus by executing wireless communication through the wireless communication interface, without requiring a specific operation of the startup icon to receive the particular status information for each received particular status information, the particular status information indicating the particular status of the image processing apparatus and switching the display of the startup icon displayed on the display device to a function icon indicating a function corresponding to the received particular status information and a status icon indicating the particular status represented by the received particular status information.

18. The function execution method according to claim 17,
wherein the method includes:
in response to detection of the second operation with respect to the function icon, displaying a particular status image indicating contents of the particular status on the display device.

19. The function execution method according to claim 17,
wherein the method includes:
in response to detection of the first operation with respect to the status icon, displaying a particular status image indicating contents of the particular status on the display device.

20. The function execution method according to claim 17,
wherein the method includes:
in response to detection of the second operation with respect to the status icon, displaying a particular status image indicating contents of the particular status on the display device.

* * * * *